United States Patent Office 3,007,885
Patented Nov. 7, 1961

3,007,885
DENSIFICATION AND GRANULATION OF MOLDING COMPOUNDS
Wilbur N. Oldham, Cheshire, and Nicholas A. Granito, Wallingford, Conn., assignors to American Cyanamid Company, New York, N.Y., a corporation of Maine
No Drawing. Filed May 25, 1959, Ser. No. 815,244
7 Claims. (Cl. 260—6)

This invention relates to decorative aminoplast molding compositions. More particularly, this invention concerns an improvement in the process for the production of pigmented, fibrous filled molding compositions based on thermosetting amino-aldehyde condensates. Specifically, this present invention relates to the manufacture of decorative aminoplast molding compositions following in general accepted practices in compounding and mixing the component parts of the composition, but wherein a novel method is provided for beneficially conditioning the molded powder prior to densifying same by means of pressure rolls.

An object of this invention is to provide an improved economical process for the manufacture of pigmented, amino-aldehyde molding compositions suitable for producing decorative molded articles having desirable surface appearance and color uniformity.

This and other objects of the invention will be more completely understood by those skilled in the art upon consideration of the detailed discussion and examples set forth hereinbelow.

Amino-aldehyde condensates are presently regarded as unexcelled resinous molding compounds for the preparation of decorative molded articles. This can be appreciated by noting the widespread and almost exclusive use of these resinous molding compounds in applications such as dinnerware, telephone handsets, home appliances and the like, where good decorative appearance is a prime consumer requisite. While the bright clear colors invariably observed for molded articles of this type may be qualities to some extent inherent in the nature of the resinuous compound, the uniformity of color and surface appearance thereof are properties fundamentally imparted by the manner of preparing or compounding the molding composition. The achievement of color uniformity within the molding composition basically concerns the proposition of reducing dry resinous impregnated fillers to fine particle sizes and effectively blending, usually concurrently, fine pigment particles uniformly therewith. In all instances the powdery blended composition must be densified to secur a composition which when molded will exhibit the required degree of uniform surface appearance. The essence of our invention resides in the novel conditioning of the ground blended molding powder, that is, moderately increasing the bulk density of the powder without application of heat, which in turn permits use of unheated pressure rolls to economically and properly densify the composition.

A decorative molding composition of the type with which this invention is concerned comprises an amino-aldehyde condensation product which has been carried to an intermediate stage of condensation whereby it remains as a resinous material soluble or readily dispersible in water or aqueous systems but nevertheless is capable under certain conditions to convert to a substantially insoluble and infusible stage. Such a composition also includes a filler, preferably a fibrous type whose presence in the molded article obviates the inherent crazing or cracking tendencies of the cured resinous component and additionally, largely accounts for the mechanical strength characteristics of the article. Supplementing the resinous molding compound and filler component are what are termed additives, several of which are essential ingredients in molding compositions of the type herein concern. Additives which are regarded as essential include: a mold lubricant whose presence aids in the ready removal of the molded article from the mold; coloring materials or opacifiers whose presence provide the decorative qualities of the molded article; and a curing catalyst which facilitates the conversion of the resinous molding compound to an infusible and insoluble state. Quite often a polymerization inhibitor is included in the composition in order to preclude any premature gelation of the resinous component thereof. Generally, in resinous molding compositions the weight ratio of the above mentioned additives to the sum total of the resinous and filler components is relatively small.

As indicated hereinabove the utility of our invention is to be realized in the practice of manufacturing decorative aminoplast molding compositions, which practice in its broader aspects is conventionally observed. Accordingly, somewhat more than a scant review of such practice will serve in a more complete understanding of this invention. In the initial step of the prior art process, a fibrous filler, e.g., alpha cellulose is impregnated with an aqueous solution of an amino-aldehyde condensation product. The alpha cellulose is ordinarily cut or shredded prior to being impregnated, however, this is not always necessary as sheet alpha cellulose may be directly charged to a mixer containing the resinous syrup. In this step the curing catalyst, premature polymerization inhibitor and mold lubricant may be added and homogeneously dispersed throughout the composition. However, the more prevalent practice is to incorporate the inhibitor and catalyst during the subsequent grinding and milling step to be discussed hereinbelow, and delay adding the mold lubricant until the molding composition in its final form is obtained. It has been found that the nature of the conventional mold lubricants permits more efficient incorporation of this ingredient by merely tumbling or similarly mixing the final granular composition and the lubricants.

After the filler has been suitably impregnated it is then dried, usually in a continuous type oven wherein the impregnated filler progresses in contact with hot air through the oven on an endless belt. The material leaves the oven in coarse granular form referred to in the art as "popcorn." To this popcorn is added the pigment material and optionally, the additives mentioned hereinabove, and the composite is then ground, milled and blended in a single operation. The essential purpose of the grinding, milling and blending operation is to comminute the popcorn to a fine particle size in the order of 20–30 microns and at the same time uniformly blend the pigments therewith.

In the present day practice of preparing high-grade decorative molding compositions, a ball-milling process for milling the "popcorn" and blending the pigment therewith is customarily observed. A ball-mill is a rotatable drum-like piece of equipment which carries a charge of flint or porcelain balls of the like or varying diameters. The mill is ordinarily filled to a depth of about ½–⅔ of its diameter with these grinding balls. The material to be comminuted fills the interstices between the balls and part of the free space above. As the mill rotates, all of the balls are set in motion and a substantial portion of the molding composition and balls rise along the wall of the drum to the top and cascades over the remaining portion. It is this type of action that uniquely permits the ball-mill process to mill and blend concomitantly in a single operation.

Material which has been properly blended leaves the ball-mill in a form of a very fluffy powder possessing a bulk density in the order of 0.25 or less. This form of the composition is unsuitable for use as a molding material for several reasons. Firstly, because of its exceedingly bulky characteristics inordinately large and expensive molds would be required. Secondly, besides difficulties involved in handling a powder of this type high dust losses are experienced which poses health problems and economical disadvantages. Accordingly, the art recognizes the requirement for densifying the ground, milled and blended material.

There are various ways practiced by the prior art for suitably increasing the bulk density of the product leaving the ball-mill. These include the use of such devices as the Banbury mixer, preform machines, and the like. A recent development in the art of densification, and one to which this instant invention is particularly directed, involves the use of pressure rolls to densify the product of the ball-mill. Briefly stated densification by the pressure roll method involves feeding the ground, milled and blended power through a set of juxtaposed pressure rollers to yield a compacted form of the power. Irrespective of the type of densification employed, the bulk density of the composition is to be increased to at least about 1.0 and preferably above 1.2.

After proper densification of the composition as stated, the material is then granulated. Granulation is essentially a practical requirement in that it facilitates the handling of the composition by the molder. Nevertheless the extent of granulation is not completely arbitrary as it is known to those skilled in this art that the granular is required to have a minimum degree of density usually expressed as apparent density. Generally granulated compositions designed for decorative applications should possess an apparent density of at least about 0.6. The concept of apparent density is a byword in the art, nevertheless, details concerning same may be found in ASM D-1182-54.

As mentioned hereinabove, this invention is primarily directed to processes for preparing decorative molding compositions wherein pressure rolls for accomplishing the required densification thereof are employed. The advantageous feature residing in the use of pressure rolls is the potentially large output capacity of densified material that may be realized by this method. However, in densifying ground molding powders the use of pressure rolls poses a very significant practical problem antithetic of the above-mentioned advantage. This problem concerns that of efficiently introducing the molding powder into the nip of the pressure rolls. Some attempts have been made to obviate this problem by employing rolls having corrugations designed to facilitate the engagement of the powder by the rolls. This expedient in itself has had but limited success.

Another expedient involves increasing the coefficient of friction of the powder. This has heretofore been achieved on occasions by wetting down the powder with water; however, the use of rather substantial amounts of water are required and accordingly this necessitates the eventual troublesome freeing of the excessive moisture content.

Another method, and the only one we believe to be commercially practiced before our invention, consists of preheating the ground powder before introducing same to the rolls of the densifier. This method is observed by passing the fluffy powder at a depth of about 4–6 inches on an endless belt through an induction heated oven.

This method necessitates heating the powder to such an extent that the polymerization of the resinous molding compound is advanced. Ordinarily, in a properly functioning process of this type, the polymerization advancement experienced falls considerably short of that represented by the thermoset stage. Therefore, barring a mechanical break-down in the heating process, the resinous condensate originally employed in the process may be prepared to take in account the inevitable advancement realized in the aforesaid heating step. Nevertheless, heating or advancing the polymerization of the molding compound presents a serious disadvantage. In any densification step, and particularly the type wherein roll densifiers are employed there is a certain amount of fines by-product, i.e., powder which has not been effectively densified. For economic reasons these fines must be reprocessed. Usually they are collected and reintroduced to the stream of powder about to enter into the heating oven. Thus it is a real probability that fines introduced in this manner may have been subjected to a number of heating exposures. Accordingly, these reworked fines may eventually show up in the final composition having a considerable advanced degree of polymerization. The resultant type of heterogeneity thereby realized has a deleterious effect on the surface appearance of articles molded therefrom.

We have discovered how to modify the physical condition of ground powder thereby rendering same suitable for densification by means of pressure rolls without the attendant disadvantages of the practiced prior art methods. The forte of our process is principally that it permits the manufacture of improved molding compositions. However, there are considerable economical advantages to be realized. Thus, the conventional heating step and the necessary apparatus required therefor can be profitably eliminated and the expensive and troublesome cleanups ordinarily experienced are in turn largely eliminated.

The essence of our invention resides in the discovery that if the product of the ball-milling operation is compressed to a critical minimum bulk density, then the powder can be efficiently introduced to the pressure rolls. The principle of our conditioning process is basically that of beneficially increasing the coefficient of friction characteristics of bulky powders by deaerating same. In order to achieve the contemplated results of our invention the referred-to deaeration must be accomplished without subjecting the powder to any significant degree of heating. The relatively critical density to which the powder must be compressed is in the order of 0.6 gram per ml. Of course, it must be realized that the minimum density value stated can be slightly less for some molding composition formulations. In most instances, however, the density will not vary more than 0.1 below that of the figure given. Minor variations in this order can be expected since a large number of different types of resinous molding compounds are contemplated herein, each of which may correspond to slightly different optimum minimum density. Also, molding compositions such as used in decorative applications vary somewhat in the ratio of filler to the resinous molding compound. However, in compositions of this type the ratio of filler to molding compound will range from about 23%; to 35%. The critical minimum density specified hereinabove, that is, about 0.6 gram per ml. has been found applicable to molding compositions containing the conventional ratio of filler to molding compound, namely, from about 23:77 to 27:73, respectively, for melamine compositions and about 28:72 to 35:65, respectively, for urea compositions.

We will set forth hereinbelow several preferred embodiments of accomplishing forcible compaction or deaeration of the product of the ball-milling process. It is to be realized that those skilled in the art can devise different methods or revise those given which would nevertheless not depart from the spirit of our invention.

One of the methods for compacting the powder in accordance with this invention consists of using an annular chamber of decreasing cross-sectional area equipped with a rotory helical screw. In this method the fluffy powder is introduced into the chamber at its maximum opening and the pitch of the screw so designed as to advance the powder toward the opposite opening. The length of the chamber and design of the screw can be suitably designed so as to effect the required degree of compaction. Accordingly, by such a method if the powder is increased in bulk density to about 0.6, the material has been properly conditioned for efficient feeding to the densification rolls.

Another method for compacting or deaerating the molding composition merely consists of mechanically advancing the powder through any type of confinement or passage which passage is equipped with ports for applying a vacuum. Of course the ports must in such instances be supplied with a screen or filter to obviate the escape of any appreciable amount of the powder being deaerated. We have found that the combination of the pressure screw arrangement as described above in conjunction with the use of properly applied vacuum to said chamber is especially adaptable for processing the bulky powder in accordance with our invention.

Still another method consists of the use of vibrators, that is, applying a vibrating force to the powder itself by inserting suitable rods within a hopper containing powder about to be fed to the pressure rolls. Also, it may be desirable to suitably vibrate the hopper itself. Generally, sufficient deaeration may be accomplished by the use of the vibrating technique or the application of a vacuum to the powder, it has been found that these methods can be most efficaciously practiced if done in conjunction with the use of a pressure screw.

While the type or design of the densification rolls does not touch upon the basic concept presented herein, nevertheless, details as to the construction of densification rolls we have found to be especially suitable will be given. The type of roll densifier we prefer to use in the practice of our invention consists of two unheated juxtapositioned rolls each containing longitudinal depressions. The cross-sectional design of the individual depression corresponds to a semi-circular area of from about 1/4" to 1/2" radius. The spacing between the individual depressions may be anywhere from 1/4" to 1/2". It is further preferred that these respective rolls be matched so as the cavity of one correspond to a land portion of the other roll. In this way the densified powder leaves the rolls in a form of a corrugated ribbon. The design of the rolls and the manner of matching same given is preferred because the fall-flow of fines is minimized if these details are observed. As indicated previously, regardless of the design of the densifying rolls, it is not known how to completely obviate obtaining a certain amount of fines by-product.

The amino-aldehyde condensates which constitute the resinous molding compounds of the composition to which this invention is directed are the reaction products of an aldehyde and an amidogen. The term amidogen employed herein contemplates those compounds containing one or more amino, amido, imino or imido radicals or combinations of same, which compounds individually or in admixture with others will react with an aldehyde to yield a potentially thermoset condensate thereof.

The preferred amidogens for preparing the resinous molding compounds include melamine, benzoguanamine and urea. In addition to these prefrred compounds there are a vast number of aldehyde reactable amidogens which may be used solely or preferably in combination with any of the preferred compounds specifically mentioned.

Representative of a class of these amidogens are those which may be characterized as an acyclic type, that is, those compounds wherein the aforesaid aldehyde reactable lagans are substitutents of carbon atoms which are not part of any ring structure. Illustrative of the acyclic type are the following: a ureide, e.g., thiourea, ethylurea, etc.; a biguanide, e.g., guanylguanidine, phenylbiguanide, etc.; a polyamide, e.g., adipamide, fumaramide, tartramide, phenylimino diacetamide, etc.; a diureide, e.g., ethylene diurea, oxybisethylene urea, 2-hydroxyl propylene diurea, etc.; a diurethane, e.g., ethylene glycol dicarbamate, diethylene glycol bis carbamate, etc.; dicyandiamide; biuret; dicyandiamidine; and the like.

Another important class of amidogens are those containing the triazine structure. Beside the preferred members of this class namely, melamine and benzoguanamine, there are the following: Deamidation products of melamine, e.g., melam, melem and melom; 2,4,6-tris(monoalkylamino)-1,3,5-triazines, e.g., 2,4,6-tris-(ethylamino)-1,3,5-triazine; 2,4,6-tris(arylamino)-1,3,5-triazines, e.g., 2,4,6-tris(phenylamino)-1,3,5-triazine; 2-chloro-4,6-diamino-1,3,5-triazine; 2-amino-4-hydroxyl-6-phenyl-1,3,5-triazine; 2,4-diamino-6-methylamino-1,3,5-triazine; ammeline; ammelide; a guanamine; e.g., formoguanamine; acetoguanamine, adipoguanamine, sebacoguanamine, diphenyladipoguanamine, and the like.

In addition to the foregoing triazine amidogens, there are the diazine amidogens that may be used as exampified by 2,4-diamino-1,3,4-thiadiazine.

Another suitable class of aldehyde reactable compounds are those containing the triazole ring such as, for example, guanazole, guanazolguanazole, 1-phenyl guanazole, 1-carbamyl guanazole, 1-benzoyl guanazole, 1-acetyl guanazole, etc.

In preparing the soluble, resinous molding compounds suitable for use in the practice of this invention, the reaction between aldehyde and the amidogen may be carried out at normal or elevated temperatures; at atmospheric, sub-atmospheric, or super-atmospheric pressures; and under neutral, alkaline or acid conditions. However it is preferred that the polymerization and any dehydration be effected under pH conditions in the range of 6.5–9.5 at a temperature of from about 60°–105° C. The acid or alkaline material capable of effecting the desirable pH conditions include a variety of salts, bases and acids, all well known in the resin art. The condensation reaction is preferably carried out in an aqueous medium, although other polar type solvents, e.g., dioxane, dimethylformamide and the like, may be employed.

The ratio of aldehyde to amidogen can be varied over a wide range depending, for example, upon the number of aldehyde reactable lagans contained by the amidogen and upon particular properties desired in the final condensation product. The aldehyde can be used in an amount sufficient to react with from one to all of the reactive hydrogens of the amidogen. Thus, when a compound such as melamine is used, one may employ from 1 to 6 mols of the aldehyde per mol of said amidogen. Similarly, when less functional amidogens are employed such as represented by benzoguanamine or urea, 1 to 4 mols of aldehyde per mol of said aldehyde reactable compounds may be used. The preferred proportions vary with the specific amidogen that is reacted with the aldehyde. However, taking for example, the preferred species of amidogens, the molar ratio of aldehyde to melamine is preferably in the range of about 1.0–3.0 and in the case of urea and benzoguanamine, the preferred molar ratio range of aldehyde to amidogen is from 1.0–2.0.

Formaldehyde or compounds engendering formaldehyde such as paraformaldehyde, hexamethylenetatramine and the like comprise the preferred aldehyde component in the preparation of the thermosetting resins useful in the practice of this invention. Nevertheless, for certain applications it may be desirable to use aldehydes such as acetaldehyde, propionaldehyde, butyraldehyde, acrolein, benzaldehyde, furfural, etc., mixtures thereof or mixtures of formaldehyde with one or more of the above-mentioned aldehydes.

The fibrous fillers suitable for the preparation of the molding composition of this invention may be selected from a wide variety of materials. As mentioned previously, alpha cellulose is commonly employed as the filler. However, other suitable fillers for decorative molding compositions include such as regenerated cellulose, cotton, linen, cloth prepared from glass fibers, nylon, wool, silk and fibrous cloth prepared from polymeric or copolymeric acrylonitrile, etc. Additionally, all or part of the filler component may be wood flour, walnut shell flour, etc., if the degree of decorative qualities sought so permit.

The catalytic ingredients that may be used for curing the thermosetting molding compounds useful in preparing the molding composition of this invention are preferably of the acid type. Numerous acid catalysts may be used for this purpose. They include inorganic acids, e.g., the phosphoric acids; organic acids, e.g., phthalic, maleic, fumaric, oxalic, tetrachloro phthalic or any of the corresponding anhydrides; acid salts, e.g., ammonium chloride or sulfate, sodium phosphate and the like. The amount of acid catalyst that may be used ranges from about 0.02 to about 5% based on the weight of the composition. The preferred range of the same basis is from about 0.1 to 1%. The acid catalyst as mentioned hereinbefore, particularly those of the water-soluble variety, may be added during the impregnation step or they may be added to the composition during the milling step. Generally a premature polymerization stabilizer is incorporated into the molding composition. Also as stated hereinbefore this ingredient may be added during the impregnation step or it may be added in the grinding step. A number of materials well known in the art serve as inhibitors for aminoplast based molding compositions, However, hexamethylenetetramine represents the preferred inhibitor. The amount of hexamethylenetetramine which may be used to effect suitable stabilization ranges from about 1 to 4% based on the resinous molding compound content of the composition.

The mold lubricants conventionally employed in decorative molding compositions can be introduced in the impregnation step or during the grinding of the popcorn. Alternatively and preferably, the most ordinarily employed lubricant namely, zinc stearate, may be incorporated or "dusted in" the final granulated product. Such a procedure is discussed in application Serial No. 692,417, filed October 25, 1957, now U.S. Patent No. 2,919,160. Other suitable molding lubricants are such as glycerol mono-stearate, cresin, carnauba wax, montan wax, zinc palmitate, calcium stearate, etc.

The pigments which may be used to prepared decorative molding compositions include innumerable varieties of industrial pigments such as used in inks, surface coating and the like applications, encompassing all colors and various shades thereof. The pigments that may be used not only include those organic and inorganic materials which are conventionally referred to in the strict sense of the word as pigments but also include organic dye materials. Suitable pigmentary materials also include opacifiers such as titanium dioxide and the like. All of the industrial pigments available are of comparatively minute sizes. Accordingly, very little further division thereof is needed, or for that matter experienced, during the grinding operation. As mentioned previously the essential purpose of the grinding operation is to comminute the impregnated filler and to accomplish the blending of the pigment material therewith.

In order that this present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

PREPARATION OF RESIN SYRUP A

A resinous molding compound comprising the condensate of formaldehyde and urea having a molar ratio of from 2:1.5, respectively, is made in the following manner. Into a suitable reaction vessel equipped with a stirrer, thermometer and reflux condenser are charged 2250 parts of low methanol content Formalin (37% aqueous formaldehyde), 1255 parts of urea and 3.75 parts of zinc oxide. The initial pH of the reaction mixture is 6.7–7.1. The reaction is then heated with stirring to 46° C. in 30 minutes. Heating is continued at 46°–50° C. until a reaction product containing a free formaldehyde product of 4.5–5.0% is obtained (approximately 1 hour) whereupon, the reaction product is cooled to room temperature. The resin solids of the resulting resinous syrup is 60%.

PREPARATION OF RESIN SYRUP B

An amino resin molding compound constituting the condensation product of formaldehyde with melamine wherein the mol ratio of formaldehyde to melamine is 2:1 is prepared in the following manner. Into a suitable reaction vessel equipped with a stirrer, thermometer and reflux condenser are charged 2279 parts of demineralized water, 1540 parts of 37% aqueous solution of formaldehyde (Formalin) and a sufficient quantity of ½ N sodium hydroxide to effect an alkaline condition of pH 8.6. Thereupon, 1197 parts of melamine are added. Heat is then applied and with stirring the reaction mixture is heated from room temperature to 98–102° C. in approximately one hour. The reaction mixture is heated at reflux (98–102° C.) until a standard condition of hydrophobity is obtained which is indicated when four drops of the reaction mixture when added to 25 ml. of water at 0–3° C. results in a solution having a blue haze. Thereupon, the resinous syrup is cooled to approximately 65° C. and vacuum concentrated at 23" vacuum (approximately 7" Hg. pressure) until 2300 parts of water are removed thus resulting in a resinous syrup having a 66% resin solids.

*Example 1*

A molding composition was prepared from the following ingredients:

| | Parts |
|---|---|
| Resinous syrup A | 1700 |
| Chopped alpha cellulose pulp | 400 |
| Hexamethylenetetramine | 126 |
| Phthalic anhydride | 2.0 |
| Lithopone | 70 |

The resinous syrup and alpha cellulose were charged to a pre-warmed mixer. Mixing was commenced and the ingredients were gradually raised to a temperature of 120° F. Mixing was continued for 30 minutes. Thereupon, impregnated filler was discharged from the mixer and screened through a 2½" mesh screen.

The screen mixture was fed to an endless belt upon which it proceeded through a standard circulating air type dryer wherein conditions of 180° F. dry bulb and 115° F. wet bulb were maintained. The impregnated material was deposited on the belt at a thickness of 3 inches. The total residence time in the dryer was approximately 80 minutes. The popcorn emerging from the dryer had a volatile content of approximately 6.0%.

To the popcorn was added the inhibitor, catalyst and pigment material and then subsequently fed into a ball mill in which it was ground for eight hours. The material leaving the ball mill possessed a bulk density of 0.25.

The ball milled powder was then fed continuously to a conical hopper equipped with a helical screw of increasing pitch. The powder, in passing through the hopper, is deaerated to an apparent bulk density of about 0.6 gram per ml. The screw discharges directly into the nip of the pair of rolls and the resultant product emerges as a continuous corrugated ribbon having a bulk density of from 1.2–1.3. The ribbon is granulated in a commercial rotating cutter equipped with a perforated screen. The resultant granular has an apparent bulk density of .60–.65 and approximately 90% is retained on a 80 mesh screen. The granular when molded produces pieces having a remarkable absence of granular marking and shows what is commonly called in the trade a "powder surface."

*Example 2*

A molding composition in accordance with this invention was made from resinous syrup B in the following manner. To a pre-warmed mixer were charged 900 parts of resinous syrup B, and 150 parts of regenerated cellulose and 150 parts of linen cloth each of which had been hammer-milled to a size corresponding to 60 mesh. Heat was applied to the mixer and with stirring the ingredients were heated to 125° F. in 10 minutes. To this mixture was added 0.2% hexachlorophthalic anhydride based on the solid resin component and 0.5%, on the same basis, of hexamethylenetetraamine. Mixing was continued at 125° F. for an additional 40 minutes. The material from the mixer was tray-dried at a thickness of approximately 3″ at a temperature of 70° C. until a free moisture content of 5.0% was obtained. To this dried material was added 45 parts of titanium dioxide and 2 parts of chrome green dark pigment and the mixture comminuted as in Example 1.

The ball milled melamine resin powder was fed continuously into a conical hopper equipped with vibrators extending below the surface of the powder. The vibrators effectively deaerated to a density of approximately 0.6 and the powder then fed into the nip of the pressure rolls by means of a screw. The corrugated resin strip emerging from the rolls was granulated in a commercial rotating cutter to produce a granular having an apparent density of 0.60–0.66. Moldings from this granular again had a superior "powder" finish showing no granular markings.

What is claimed is:

1. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) densifying the comminuted composition by forceable deaeration at ambient room temperatures, thereby increasing the bulk density of said composition to at least about 0.6 gram per milliliter, (5) thereupon passing the deaerated, densified composition through unheated, juxtaposed pressure rolls, thereby further densifying said composition to a bulk density of at least about 1.0 gram per milliliter, and thereafter (6) granulating the densified composition.

2. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) densifying the comminuted composition by forceable deaeration at ambient room temperatures, thereby increasing the bulk density of said composition to at least about 0.6 gram per milliliter, (5) thereupon passing the deaerated, densified composition through unheated, juxtaposed pressure rolls, thereby further densifying said composition to a bulk density of from about 1.2 to 1.3 grams per milliliter, and thereafter (6) granulating the densified composition.

3. A process for the manufacture of an aminoplast molding composition which comprises: (1) impregnating a fibrous filler with a resinous syrup of a thermosetting condensate of an aldehyde and a compound containing aldehyde reactable amino groups, (2) drying the impregnated composition to a volatile content of less than about 10%, (3) comminuting and homogeneously blending the dried impregnated composition, (4) deaerating the comminuted composition by advancing said composition at ambient room temperatures through an enclosed chamber and applying a negative pressure to a passage in the casing of said chamber communicating with the advancing comminuted composition, thereby increasing the bulk density of said composition to at least about 0.6 gram per milliliter, (5) thereupon passing the deaerated, densified composition onto the nip of unheated, juxtaposed pressure rolls, thereby further densifying said composition to a bulk density of at least about 1.0 gram per milliliter, and thereafter (6) granulating the densified composition.

4. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) deaerating the comminuted composition by advancing said composition at ambient room temperatures through an enclosed chamber, applying a negative pressure to a passage in the casing of said chamber communicating with the advancing comminuted composition and also applying a vibratory force to the advancing comminuted composition by means of vibrating rods positioned within the passage defined by the casing of said chamber, thereby increasing the bulk density of said composition to at least about 0.6 gram per milliliter, (5) thereupon passing the deaerated, densified composition onto the nip of unheated, juxtaposed pressure rolls, thereby further densifying said composition to a bulk density of at least about 1.0 gram per milliliter, and thereafter (6) granulating the densified composition.

5. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) deaerating the comminuted composition by advancing said composition at ambient room temperatures through an enclosed conical chamber in the direction of said chamber's decreasing cross-sectional area, thereby increasing the bulk density of said composition to at least about 0.6 gram per milliliter, (5) thereupon passing the deaerated, densified composition onto the nip of unheated, juxtaposed pressure rolls, thereby further densifying said composition to a bulk density of at least about 1.0 gram per milliliter, and thereafter (6) granulating the densified composition.

6. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) deaerating the comminuted composition by advancing said composition at ambient room temperatures through an enclosed conical chamber in the direction of said chamber's decreasing cross-sectional area by means of a rotary helical screw contained in said chamber and applying a negative pressure to a passage in the casing of said chamber communicating with the advancing comminuted composition, thereby increasing the bulk density of said composition to at least about 0.6 gram per milliliter, (5) thereupon passing the deaerated, densified composition onto the nip of unheated, juxtaposed pressure rolls, thereby further densifying said composition to a bulk density of at least about 1.0 gram per milliliter, and thereafter (6) granulating the densified composition.

7. A process for the manufacture of an aminoplast molding composition which comprises: (1) impregnating a fibrous filler with a resinous syrup of a thermosetting condensate of an aldehyde and a compound containing aldehyde-reactable amino groups, (2) drying the impregnated composition to a volatile content of less than about 10%, (3) comminuting and homogeneously blending the dried impregnated composition, (4) deaerating the comminuted composition by advancing said composition at ambient room temperatures through an enclosed conical chamber in the direction of said chamber's decreasing cross-sectional area by means of a rotary helical screw contained in said chamber, applying a vibratory force to the advancing comminuted composition by means of vibrating rods encircling said screw at a point remote from the discharge end of said screw, and applying a negative pressure to a passage in the casing of said chamber communicating with the advancing comminuted composition, thereby increasing the bulk density of said composition to at least about 0.6 gram per milliliter, (5) thereupon passing the deaerated, densified composition onto the nip of unheated, juxtaposed pressure rolls, thereby further densifying said composition to a bulk density of at least about 1.0 gram per milliliter, and thereafter (6) granulating the densified composition.

References Cited in the file of this patent
UNITED STATES PATENTS 2,056,436     Rodgers et al. _____ Oct. 6, 1936